UNITED STATES PATENT OFFICE.

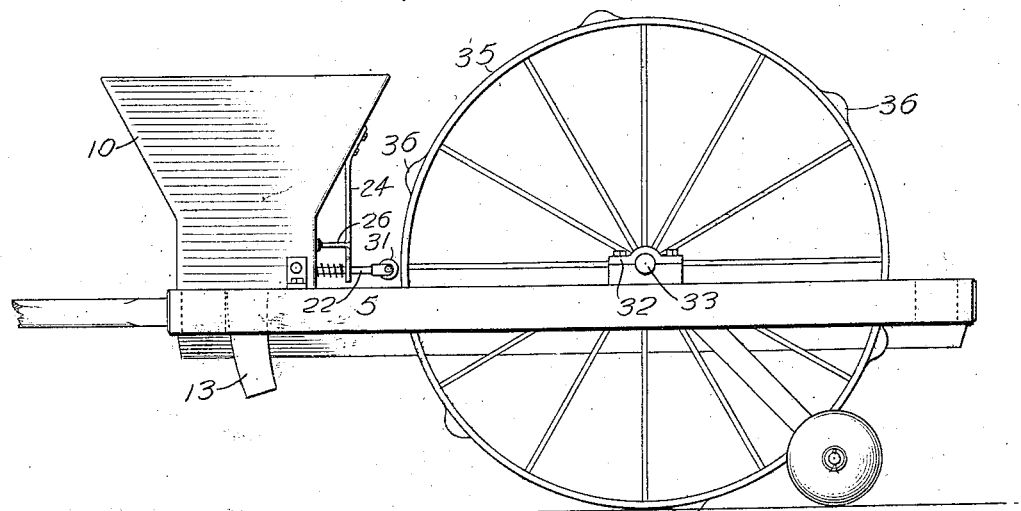
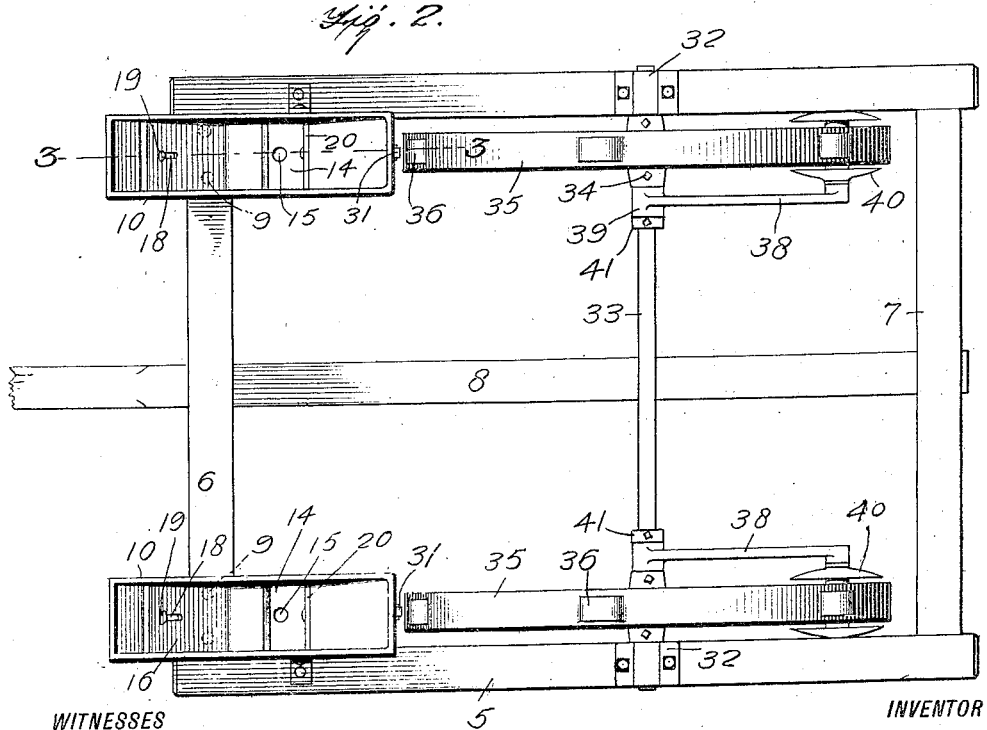

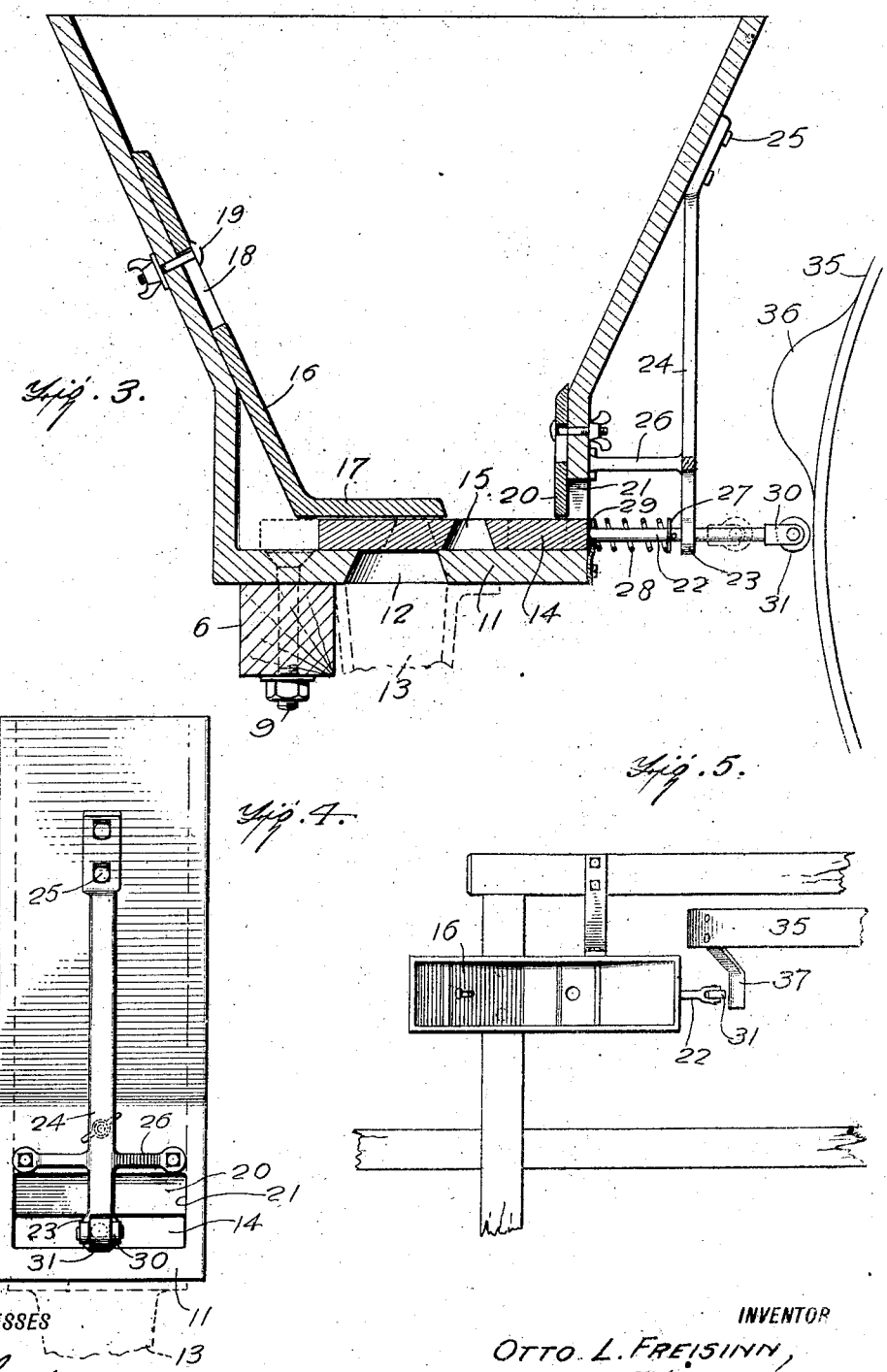

OTTO LEO FREISINN, OF SANTA ROSA, CALIFORNIA.

UNIVERSAL PLANTER.

1,170,237.   Specification of Letters Patent.   Patented Feb. 1, 1916.

Application filed February 19, 1914. Serial No. 819,714.

*To all whom it may concern:*

Be it known that I, OTTO L. FREISINN, a citizen of the United States, and a resident of Santa Rosa, in the county of Sonoma and State of California, have invented an Improvement in Universal Planters, of which the following is a specification.

This invention relates to agricultural implements, and more particularly to an improvement in planters.

One of the principal objects of my invention is to provide an improved planter having a delivery hopper providing means which may be automatically operated by a ground wheel for delivering seeds at predetermined spaced intervals.

Another object is to provide a planter having an automatically operable device for planting the seeds at spaced intervals, and means for covering the seeds.

A further object of the invention is to provide an arrangement whereby the planted rows may be spaced at desired distances apart.

Still another object is to provide an improved planter of the class described which will be simple, durable, efficient in operation and inexpensive to manufacture.

With these and other objects in view which will become apparent as the description proceeds, the invention resides in the construction, combination and arrangement of parts hereinafter more fully described and claimed, and illustrated in the accompanying drawings in which like characters of reference indicate like parts throughout the several figures, of which—

Figure 1 represents a side elevational view of a planter constructed according to my invention. Fig. 2 represents a top plan view thereof. Fig. 3 represents an enlarged vertical longitudinal sectional view through the hopper taken on the plane indicated by the line 3—3 of Fig. 2. Fig. 4 represents a rear end elevational view thereof, and Fig. 5 represents a fragmentary top plan view of a modified form of the invention.

Referring more particularly to the drawings, the frame of the planter comprises side bars 5, a front end bar 6 and a rear end bar 7, said bars 6 and 7 connecting the ends of the side bars 5. A draw pole 8 is secured longitudinally of the frame, and centrally of the end bars 6 and 7. Secured at each end of the cross bars 6, by means of bolts or other fastening means 9, is a hopper 10, whose sides are disposed in vertical parallel relation to each other, and whose ends are slanted, and converge downwardly toward the bottom, and terminate at their lower ends in vertical parallel end walls.

The bottom 11 of the hopper is provided centrally with a discharge opening 12, which communicates with a spout 13 secured in any desired manner to the bottom 11 and extending downwardly toward the ground.

A slide 14 of a length considerably less than the length of bottom 11 and of a width equal to the width thereof is positioned on bottom 11 and is adapted to slide longitudinally thereof between the vertical portions of the end walls. The slide 14, is provided with a cone shaped opening 15, which may be designated a seed measuring pocket, and when the slide is in the position shown in Fig. 3, that is at the rear limit of its movement, the pocket 15 is closed by the bottom 11 and is in position to receive a portion of the seeds contained in the hopper, and when pushed forwardly will as may be readily understood, register with the opening 12 in bottom 11 whereby the seeds will be deposited from the pocket through the opening and through the spout onto the ground. A guard plate 16 is provided, having a lower foot portion disposed at an angle to plate 16, and in parallel and spaced relation with bottom 11 and the foot portion 17 is adapted to rest on top of slide 14, and extends rearwardly to overhang and completely cover opening 12, but not so far as to overhang opening 15 when the slide is in its rearward position, whereby as will be understood when the slide is pushed forwardly the pocket 15 will come underneath the foot portion as it registers with opening 12, so that while the pocket is in registration with the opening, the seeds contained in the hopper will be prevented from entering the pocket. Plate 16 is provided with an elongated slot 18 which rides over a set screw or bolt 19, so that the plate may be adjusted to accommodate slides of various thicknesses. A rear plate 20 is provided, and is secured to the vertical portion of the rear wall of the hopper, and is disposed to rest at its lower edge upon the top of slide 14, and to prevent seeds from getting out through the opening 21 provided in the lower end of the vertical portion of the rear wall of the hopper, through which the rear end of slide 14 extends. The opening 21 is of greater height than the slide shown is thick, whereby slides of various thickness may be accommodated, and plate 20 is adjustable in the same manner as plate 16.

The slide is provided with a rearwardly extending stem 22, which projects through a bearing 23 formed on the lower edge of a guide plate 24 secured at its upper end as at 25 to the rear wall of the hopper, and provided with legs 26 which are secured to the vertical portion of said rear wall, for maintaining the guide plate in braced position and in spaced relation with the vertical portion of said rear wall. A collar 27 is secured to stem 22 between the guide plate 24 and the hopper, and serves as a bearing for the rear end of the coiled spring 28, whose forward end bears against a plate 29 through which stem 22 extends, said plate being secured to the bottom 11 of the hopper. The function of spring 28 is to normally hold the slide 14 in rearward position. The stem is provided at its rear end with a bearing 30 in which is journaled a wheel 31.

Journaled transversely of the frame, in bearings 32, is a shaft 33 on which is secured by means of set screws 34, a pair of ground wheels 35, each of said wheels being disposed immediately to the rear of one of the hoppers, and the wheels are provided at spaced intervals on their periphery with rounded lugs 36, which are adapted as the wheels rotate to alternately engage the wheels 31 carried by the stems 22, thereby forcing said stems forwardly and with them the slides, so that seeds are at intervals discharged through the spouts onto the ground. As soon as the lugs pass out of engagement with wheels 31, the springs 28 draw the slides rearwardly to receive a new charge of seeds.

The wheels are secured to the shaft, which is rotatably journaled in the bearings, in such a manner that the lugs on the wheels are in alinement with each other transversely of the frame and it is evident that if so desired a number of wheels may be secured to the shaft, and spaced apart the distance that the planted rows are to be spaced apart, each of said wheels being adapted to actuate a slide in a hopper secured to the front bar 6 of the frame.

In the embodiment illustrated in Fig. 5, the hopper is not in alinement with the wheel, but is offset to one side thereof, and the wheel is provided with a plurality of inwardly extending arms 37, which are rounded or curved at their inner ends as shown, and are positioned so as to engage the wheel 31 carried by the stem 22, whereby to operate the slide in the manner previously described.

Loosely positioned on shaft 33, are a pair of arms 38 provided at their upper ends with eyes 39 through which shaft 33 extends, and arms 38 extend downwardly toward the ground, and at their rear ends are bent at right angles to extend across the ground wheels, and on each bent end is journaled a pair of covering disks 40, which are spaced apart a distance slightly greater than the width of wheel 35, and said disks are adapted to travel in the wake of the wheel and to cover the seeds as they are deposited. As illustrated the eyes 39 are disposed on the shaft in engagement with the inner ends of the wheel hubs, and they are maintained in place by means of collars 41 keyed or otherwise secured onto shaft 33. The arms 38 are disposed on the inner sides of the wheels, and at their rear ends are bent outwardly in opposite directions so that their rear ends extend across the wheels.

Should more ground wheels than shown be used, a pair of covering disks would be associated with each so that the seeds in the row would be covered.

Although I have described the preferred embodiment of my invention, I may desire to make such changes in the construction, combination and arrangement of parts as do not depart from the spirit of the invention and the scope of the appended claims.

I claim:

1. A planter comprising a frame, hoppers secured to said frame and provided with discharge openings in the bottoms thereof, slides positioned on the bottoms of the hoppers and provided with seed pockets, stems secured to said slides, guide plates secured to the hoppers through which said stems extend, collars secured on said stems between said guide plates and hoppers, bearing plates secured to said hoppers, through which said stems extend, springs interposed on said stems between said collars and bearing plates, wheels carried by said stems, a shaft carried by said frame, ground wheels carried by said shaft, and rounded lugs disposed at spaced intervals on the periphery of said wheels, said lugs adapted to engage the wheels carried by said stems whereby said wheels may be actuated to discharge seeds through said discharge openings at intervals.

2. A planter comprising a frame, a plurality of hoppers positioned thereon, seed discharge means carried thereby, a shaft carried by said frame, ground wheels carried by and adjustable longitudinally of said shaft, coöperating means between said ground wheel and seed discharge means whereby said seed discharge means will be operated at intervals for discharging seed from said hoppers, said coöperating means including elements positioned at spaced intervals circumferentially of said ground wheels, and in alinement with each other transversely of the frame, covering means in the wake of the ground wheels, and means whereby the covering means may be adjusted longitudinally of the shaft.

OTTO LEO FREISINN.

Witnesses:
FERNANDO G. C. BOCKELMANN,
J. ELMER MOBLEY.

Copies of this patent may be obtained for five cents each, by addressing the "Commissioner of Patents. Washington, D. C."